United States Patent [19]
Gashgaee et al.

[11] Patent Number: 6,021,925
[45] Date of Patent: Feb. 8, 2000

[54] APPARATUS FOR DISPENSING PRECISE VOLUMES OF A LIQUID

[75] Inventors: Iraj Gashgaee, Waltham; Graham Eacock, Westborough; George L. Gonnella, Pepparell, all of Mass.

[73] Assignee: Millipore Corporation

[21] Appl. No.: 09/063,079

[22] Filed: Apr. 21, 1998

[51] Int. Cl.[7] .................................................. F04B 43/14
[52] U.S. Cl. .................................................. 222/333
[58] Field of Search .................................. 222/333, 249, 222/250, 386.5, 386; 417/413.1, 418, 534

[56] References Cited

U.S. PATENT DOCUMENTS

| | | | |
|---|---|---|---|
| 2,169,862 | 8/1939 | Whitted | 103/150 |
| 3,139,952 | 7/1964 | Jackson | 184/7 |
| 3,267,867 | 8/1966 | Davis, Jr. | 103/53 |
| 3,437,043 | 4/1969 | Sander | 103/53 |
| 3,496,878 | 2/1970 | Hargest et al. | 103/152 |
| 3,707,338 | 12/1972 | Hilford | 417/416 |
| 4,607,627 | 8/1986 | Leber et al. | 128/66 |
| 4,639,245 | 1/1987 | Pastrone et al. | 604/152 |
| 4,832,582 | 5/1989 | Buffet | 417/413 |
| 5,284,425 | 2/1994 | Holtermann et al. | 417/395 |
| 5,330,330 | 7/1994 | Kuwabara et al. | 417/413 R |
| 5,492,449 | 2/1996 | Hunklinger et al. | 417/259 |
| 5,599,174 | 2/1997 | Cook et al. | 417/413.1 |

FOREIGN PATENT DOCUMENTS

| | | |
|---|---|---|
| 0428 500 B1 | 12/1995 | European Pat. Off. . |
| WO 93/10351 | 5/1993 | WIPO ................ 417/483 |

Primary Examiner—Steven O. Douglas
Attorney, Agent, or Firm—John Dana Hubbard, Esq.; Timothy J. King, Esq.

[57] ABSTRACT

An apparatus is provided for delivering precise volumes of a sample liquid. A piston is moved linearly into a first chamber containing an incompressible hydraulic liquid. The chamber includes one wall formed of a flexible diaphragm. The diaphragm separates the first chamber from a second chamber containing a sample liquid. The degree of expansion of the diaphragm and dispensing of the sample liquid from the second chamber are dependent upon the position of the piston within the first chamber.

13 Claims, 3 Drawing Sheets

APPARATUS FOR DISPENSING PRECISE VOLUMES OF A LIQUID

BACKGROUND OF THE INVENTION

1. Field of the Invention

This invention relates to an apparatus for delivering precise volumes of a liquid repeatedly. More particularly, this invention relates to an apparatus which utilizes a pressurized hydraulic liquid to deliver precise volumes of a sample liquid.

2. Description of Prior Art

A variety of industries require the delivery of precise volumes of a liquid to an area of use. For example, precise volumes of a photoresist composition are delivered to a silicon wafer substrate in order to form a photoresist layer of uniform thickness onto the wafer. The requirement for precise volume delivery must be effected by an apparatus which is capable of delivering the same volumes of samples repeatedly over long time periods.

A wide variety of apparatus presently are available for delivering liquids. Apparatus which utilize a bellows are undesirable since the walls of the bellows are compliant. The volume of fluid displaced thus will vary depending on the pressure of the fluid.

Apparatus which utilize a pressurized gas to move a mechanical element such as a diaphragm which, in turn, displaces a fluid also are undesirable since gases are compressible and the volume of the gas depends upon the pressure to which the gas is subjected. Thus, volume of fluid displaced will vary depending on the pressure of the fluid.

Apparatus which utilize a solenoid to move a piston or the like also are undesirable since normal variations in electrical power delivered to the solenoid results in a variance of piston stroke length and thus, a variance in volume of fluid delivered. It is also difficult to control a position of a solenoid arm to other than its two extreme positions.

Accordingly, it would be desirable to provide an apparatus capable of delivering precise volumes of liquid repeatedly. In addition, it would be desirable to provide such an apparatus which is capable of delivering precise volumes of liquid over extended time periods.

SUMMARY OF THE INVENTION

The present invention provides an apparatus for delivering precise volumes of a liquid. The apparatus includes a linear actuator stepping motor which drives a piston into and out of a reservoir containing an incompressible hydraulic liquid. In one embodiment, the reservoir includes a wall formed of a flexible diaphragm which expands and retracts in response to movement of the hydraulic liquid within the reservoir. During expansion of the diaphragm, a liquid sample is dispensed from a sample reservoir to a point of use of the liquid sample. During retraction of the diaphragm, the dispensed liquid sample is replaced with additional liquid sample into the sample reservoir. Two chambers are separated by the diaphragm. One chamber houses the hydraulic liquid and the second chamber houses the sample liquid. In a second embodiment, the diaphragm can be eliminated. In this embodiment, the piston acts directly on the sample liquid without the need for a separate hydraulic liquid.

DESCRIPTION OF SPECIFIC EMBODIMENTS

Figure 1:
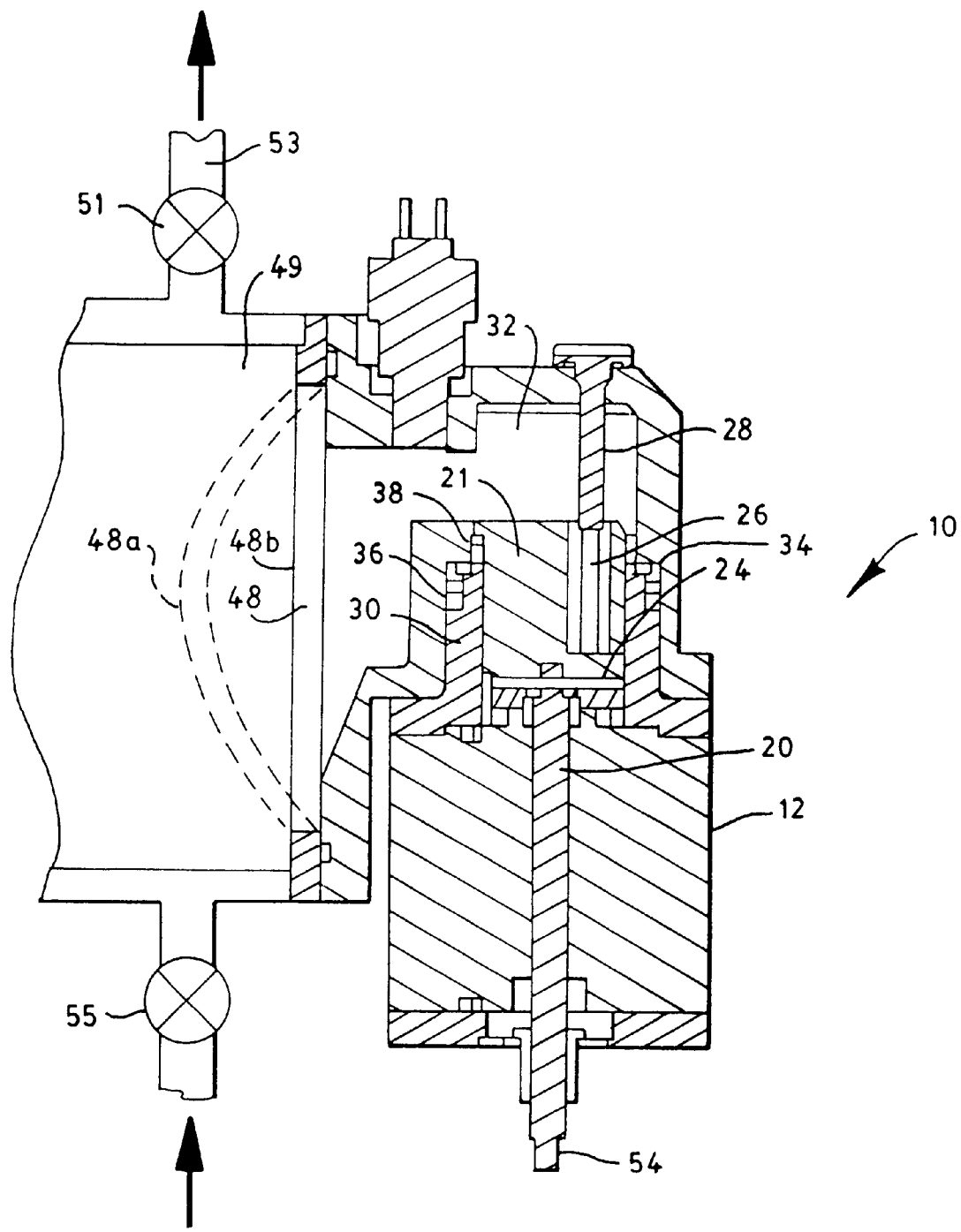
FIG. 1 is a side cross-sectional view of an embodiment of the apparatus of this invention.

The present invention provides an apparatus which utilizes a moving piston to displace an incompressible hydraulic liquid. The displaced hydraulic liquid, in turn causes a flexible diaphragm to expand into a sample liquid reservoir containing a sample liquid. Under the force exerted by the expanding diaphragm, a precise volume of sample liquid is dispensed from the reservoir to a point of use.

The piston is mounted on a shaft which is moved linearly without being rotated. The means for effecting linear movement of the shaft while avoiding rotation of the shaft include a linear or a rotary stepper motor or alternatively, a servo motor, a threaded shaft positioned within a motor driven rotatable nut including means for preventing shaft rotation or the like.

For convenience, this invention will be described below specifically with reference to the preferred embodiment of utilizing a threaded shaft positioned within a rotatable nut to effect linear movement of the shaft while preventing rotation of the shaft and with reference to the embodiment wherein a chamber containing a hydraulic liquid is separated from a chamber containing a sample liquid by a diaphragm. The piston for displacing hydraulic liquid is attached to a threaded shaft which is positioned within a motor driven rotatable nut having threads which mate with the threads of the threaded shaft. When the motor is rotationally actuated, the piston is moved linearly either into or out of the hydraulic liquid positioned within the chamber having one wall comprising the flexible diaphragm.

In a preferred embodiment, a sealing arrangement is provided between the moving piston and a stationary housing for the piston which includes a spring biased seal structure. Preferably it is an energized spring seal, such as is available from Bal Seal Corporation of California. The seal structure preferably has a U-shaped cross section. The inner radius of the seal which contacts the piston is spring biased toward the piston so as to provide intimate contact with the piston surface. The spring-loaded seal, together with the remaining portion of the sealing arrangement prevents by-pass and leakage of hydraulic liquid around the piston and air inclusion into the hydraulic fluid. This sealing arrangement, in turn, permits the apparatus of this invention to be used repeatedly over long time periods to deliver the same precise volume of a sample liquid to a point of use. Optionally, more than one such seal may be used, such as two or three of these seals mounted along various portions of the length of the piston. While the sealing arrangement set forth above is preferred, it should be obvious to one skilled in the art that other sealing arrangements may also be used such as, but not limited to one or more O-rings secured around the circumference of the piston or one or more various metal glands or metal or polymeric packings, all of which perform the function of sealing the piston and wall of the chamber from leakage of fluid past the piston and prevent the inclusion of air. If desired a combination of different seals may also be used.

Figure 2:
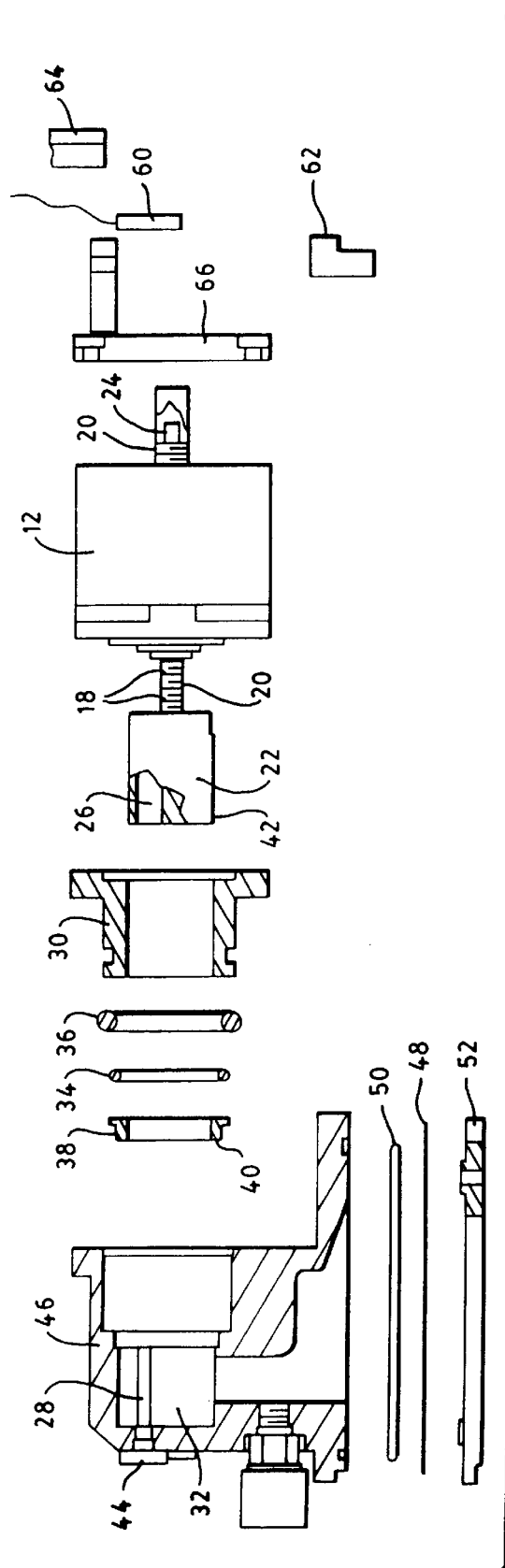
FIG. 2 is an exploded view, in partial cross-section of the apparatus of FIG. 1.
Figure 3:
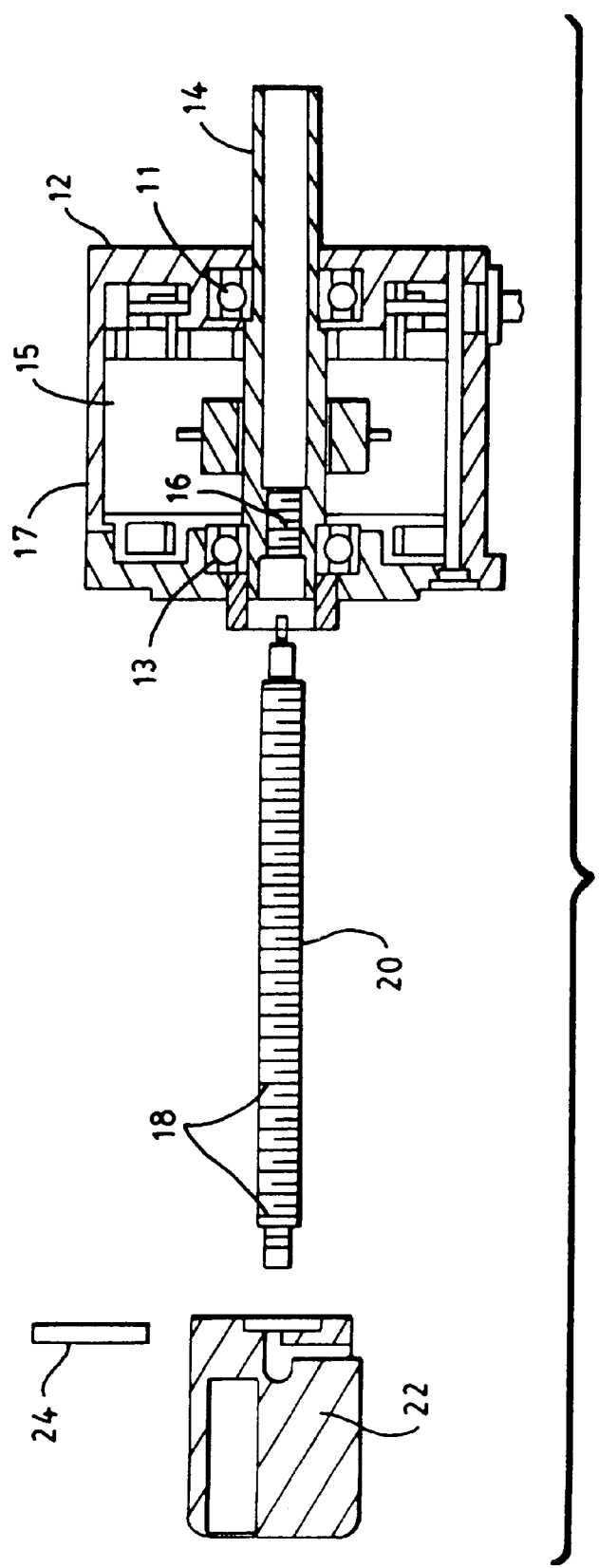
FIG. 3 is an exploded view in partial cross-section of a linear actuator and piston structure utilized in the present invention.

Referring to FIGS. 1, 2 and 3, the apparatus of this invention 10 includes a motor 12 which includes an internal, rotatable nut 14 mounted on bearings 11 and 13. The nut 14 has threads 16 which mate with the threads 18 of shaft 20.

Motor 12 is a stepper motor designed to effect rotation of the nut 14 in both the clockwise and counterclockwise directions. An electrical coil 15 and magnet 17 surround nut 14 and, when the coil 15 is energized, nut 14 is caused to rotate either in the clockwise or counterclockwise direction. Shaft 20 is secured to piston 22 by pin 24.

Piston 22 includes an open slot 26 into which pin 28 fits to prevent rotation of the piston 22. Rotation of the piston 22 also can be effected by means of a key way positioned on an outside surface of the piston which mates with a key positioned on an inner wall of the housing for the piston or any other well know means for preventing the rotation of a linearly moving object. Piston 22 is sized to fit tightly within housing 30. Sealing, to prevent by-pass of liquid from chamber 32 to motor 12 is provided by spring-biased shaped seal 38 with sealing back up O-ring 36. Leg 40 of seal 38 is spring biased so that it fits tightly about the entire outer periphery 42 of piston 22. O-ring 34 provides a preloaded bias of the seal 38 to the housing 46. Additional seals such as seal 38 also can be utilized to seal about piston 22.

To effect use of the present invention, chamber 32 is filled with an incompressible hydraulic liquid by removing plug 44 while ensuring that all compressible gas is removed. One wall of chamber 32 is formed of a construction which includes a flexible diaphragm 48 which is retained on housing 46 by O-ring 50 and plate 52. Plate 52 can be secured to housing 46 by any conventional means including screws, bolts or the like.

Sensing means can be employed to sense the position of the end 54 of the shaft 20 including a shaft position sensor, such as a photo sensor 62 to sense the home position of the end 64 of shaft 20, an additional shaft encoder 64 can be used to sense the position of the shaft 20. These sensors 62 and 64 can be mounted on bracket 66.

In operation, shaft position sensor 62 senses whether end 54 of shaft 20 is in its home position. In response to the determination of end 54 being in its home position, motor 12 is activated to rotate threaded nut 14 in order to move threaded shaft 20 and piston 22 away from motor 12 to a predetermined position in chamber 32. Pin 28 is positioned in slot 26 of piston 22 thereby to prevent piston 22 from rotating and to allow the piston 22 to move linearly into chamber 32. The piston 22 displaces liquid and causes diaphragm 48 to expand to position 48a (FIG. 1). The expanded diaphragm increases pressure within chamber 49 and when valve 51 is open and valve 55 is closed, sample liquid within chamber 49 is dispensed through conduit 53 to a point of use (not shown). After piston 22 has risen to a predetermined height within chamber 32, motor 12 is reversed to reverse the direction of rotation of nut 14. This reversal of rotation causes the shaft 20 and piston 22 to move toward motor 12 and away from chamber 32. Movement of the piston from the chamber 32 reduces pressure within chamber 32 so that the diaphragm 48 is positioned as shown at 48b (FIG. 1). When the diaphragm 48 is so positioned, pressure within chamber 49 then is reduced. Valve 55 is opened and valve 51 is closed so that sample liquid at the volume previously dispensed from chamber 49 can be reintroduced into chamber 49. This cycle then is repeated.

In a second embodiment of this invention, the diaphragm 48 of the apparatus of FIGS. 1 and 2 is eliminated when contamination of the sample liquid or degradation of the apparatus of this invention are not a problem. In this embodiment, only the sample liquid is required and the hydraulic liquid is eliminated. Dispensing of the sample liquid is effected by the increased pressure exerted on the sample liquid by the piston moving into the sample liquid. Refilling of the chamber for the sample liquid is effected by a reduction in pressure effected by a movement of the piston away from the sample liquid.

We claim:

1. An apparatus for repeatedly dispensing a precise volume of a dispensed liquid which comprises:

a chamber filled with an incompressible liquid, a piston positioned within a housing, sealing means between said piston and said housing for preventing liquid in said chamber from by-passing said piston or said housing, a threaded shaft and a motor driven rotatable nut having threads which mate with said threaded shaft for effecting linear movement in opposite directions of a shaft attached to a piston to effect linear movement of said piston within said chamber while preventing rotation of said shaft and said piston, means for preventing rotation of said piston selected from the group consisting of a fixed pin positioned within a slot in said piston and a keyway positioned on the outer surface of the piston mating with a key positioned on an inner wall of the housing for the piston, means for effecting dispensing a volume of a dispensed liquid from a housing for said dispensed liquid having an inlet and an outlet, said volume being dependent upon a position of said piston within said chamber, and means for controlling a position of said piston thereby to control said volume.

2. The apparatus of claim 1 wherein said sealing means includes a spring biased seal positioned about the periphery of said piston.

3. The apparatus of claim 1 wherein the chamber and the housing for said dispensed liquid are in fluid communication.

4. The apparatus of claim 1 wherein the chamber and the housing for said dispensed liquid are separated and sealed from each other by a flexible diaphragm.

5. An apparatus for repeatedly dispensing a precise volume of a sample liquid which comprises:

a chamber filled with an incompressible liquid, a wall of said chamber comprising a flexible diaphragm, sealing means between said piston and said housing for preventing liquid in said chamber from by-passing said piston or said housing, a threaded shaft and a motor driven rotatable nut having threads which mate with said threaded shaft for effecting linear movement in opposite directions of a shaft attached to a piston while preventing rotation of said shaft and said piston, means for preventing rotation of said piston selected from the group consisting of a fixed pin positioned within a slot in said piston and a keyway positioned on the outer surface of the piston mating with a key positioned on an inner wall of the housing for the piston, said diaphragm being expanded to a degree which depends upon a position of said piston within said chamber, and means for controlling a position of said piston thereby to control said volume.

6. The apparatus of claim 5 wherein said sealing means includes one or more spring biased seals positioned about the periphery of said piston.

7. The apparatus of claim 6 wherein a surface of said diaphragm is positioned in a second chamber containing said sample liquid, said second chamber having an inlet and an outlet.

8. The apparatus of any one of claims 5, or 6 wherein said sealing means include a seal selected from the group consisting of one or more canted spring seals, O-rings, glands, packings and combinations thereof positioned about the circumference of said piston.

9. The apparatus of claim 5 wherein a surface of said diaphragm is positioned in a second chamber containing said sample liquid, said second chamber having an inlet and an outlet.

10. The apparatus of claim 5 wherein a surface of said diaphragm is positioned in a second chamber containing said sample liquid, said second chamber having an inlet and an outlet.

11. An apparatus for repeatedly dispensing a precise volume of dispersed liquid which comprises:

a chamber filled with an incompressible dispersed liquid, said chamber having an inlet and an outlet, a piston positioned within a housing, sealing means between said piston and said housing for preventing liquid in said chamber from by-passing said piston or said housing, a threaded shaft and a motor driven rotatable nut having threads which mate with said threaded shaft for effecting linear movement in opposite directions of a shaft attached to a piston while preventing rotation of said shaft and said piston, means for preventing rotation of said piston selected from the group consisting of a fixed pin positioned within a slot in said piston and a keyway positioned on the outer surface of the piston mating with a key positioned on an inner wall of the housing for the piston, said dispersed liquid being dispensed from said chamber in an amount which depends upon a position of said piston within said chamber, and means for controlling a position of said piston thereby to control said volume.

12. The apparatus of claim 11 wherein said sealing means includes one or more spring biased seal positioned about the periphery of said piston.

13. The apparatus of any one of claims 11, or 12 wherein said sealing means include a seal selected from the group consisting of one or more canted spring seals, O-rings, glands, packings and combinations thereof positioned about the circumference of said piston.

\* \* \* \* \*